Sept. 3, 1946.  R. E. BONNER ET AL  2,406,989
TACK TESTING DEVICE
Filed July 1, 1944
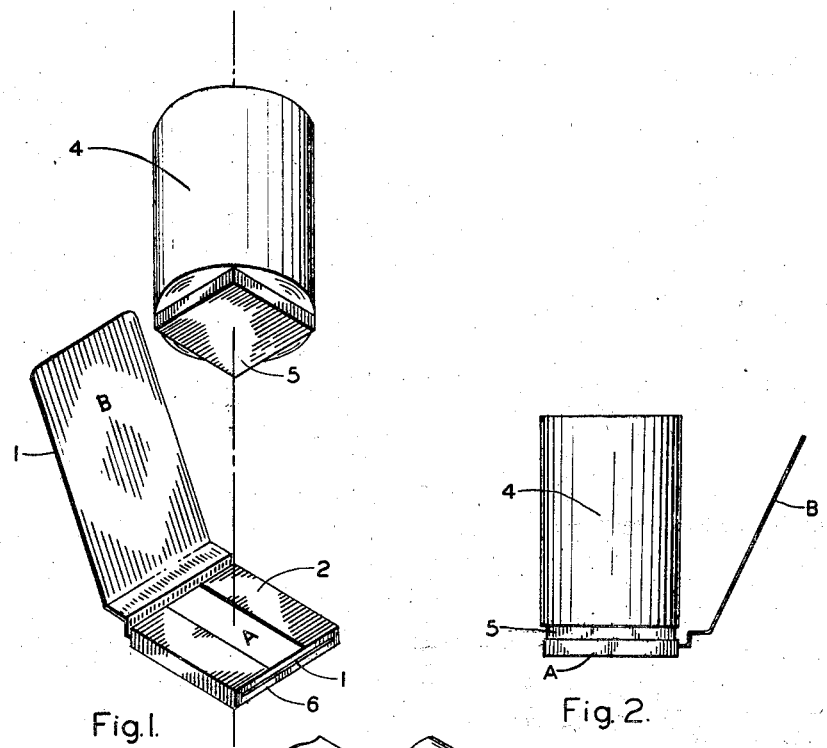
Fig.1.  Fig.2.
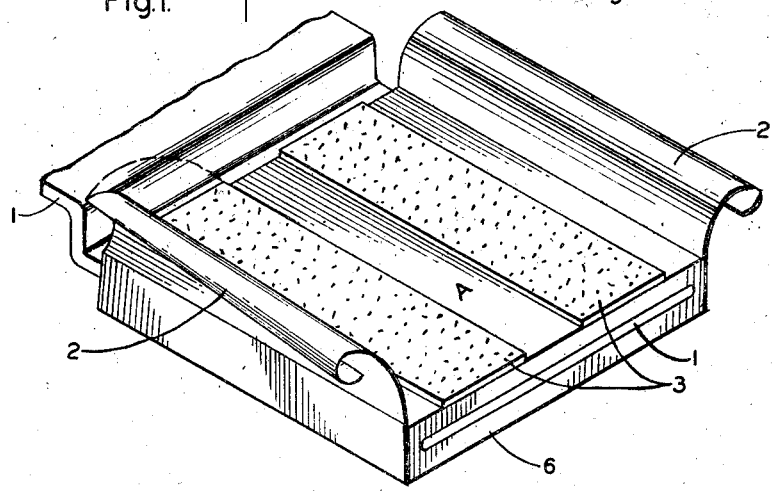
Fig.3.
Rowland E. Bonner
Morris D. Brewster
INVENTORS
BY 
ATTORNEY Patented Sept. 3, 1946

2,406,989

UNITED STATES PATENT OFFICE 2,406,989

TACK TESTING DEVICE

Rowland E. Bonner, Stamford, Conn., and Morris D. Brewster, Wilmington, Del., assignors to Atlas Powder Company, Wilmington, Del., a corporation of Delaware Application July 1, 1944, Serial No. 543,110

2 Claims. (Cl. 73—150)

The present invention relates to the art of testing devices and is more particularly concerned with a device which is adapted to test the tackiness of surfaces such as varnish or lacquer films, resin surfaces or coatings, and the like. While in its preferred embodiment the device is peculiarly adaptable to the testing of surfaces to determine whether or not they are tack free, it is to be understood that the device is not limited to such use since, as is more particularly pointed out hereinafter, it may be employed to test and determine comparative tackiness of surfaces.

In its more specific aspects the invention contemplates and provides a device comprising a flat surface which may be simply applied for a few seconds to a surface to be tested and then, through a counterbalancing effect, stripped from the surface to indicate tackiness in accordance with predetermined standards.

The prime object of the invention is to provide a device of the aforesaid character which is extremely simple and rugged in construction, which has no moving parts and which readily and quickly determines tackiness of surfaces.

For a proper understanding of the device, reference is now had to the accompanying drawing, in which—

Fig. 1 is a disassembled perspective view of the device;

Fig. 2 is a side elevation of the assembled device; and

Fig. 3 is a fragmentary perspective view of the base.

The device comprises, in general, two portions—a base or surface contacting portion very generally designated as A, and a counterbalancing portion very generally designated as B. These portions are made up, as clearly shown in the drawing, by a unitary, comparatively light weight, but rigid, strip 1 bent, as shown, to form the flat counterbalancing portion B disposed at a desired angle to the base or surface contacting portion A. Around the base portion A is tightly wrapped and held a pad 6 of paper or other relatively soft material, and around the pad is wrapped a thin sheet 2, such as aluminum or other foil, paper, cloth, or the like. This sheet is wrapped around and attached tightly to pad 6 and base member A by any suitable adhesive means. As shown, strips of Scotch tape 3, with the adhesive surface upmost, are attached to the upper edges of base A, the sheet 2 being drawn tightly around pad 6 and base A and pressed on the surface of the Scotch tape to secure a tight fit.

For use with the testing apparatus, there is provided weight 4 which may be of any desirable cross section, in this case shown as circular. At the bottom of the weight, there is provided square shaped pad 5 which aids in centering the weight on the base portion A when the device is being used.

In operation, the weight 4 is placed on top of the base portion A, in the center thereof, and then the device with the applied weight is placed on the surface to be tested for tackiness. After a certain length of time, the weight is removed from the base portion A and the device is allowed to rest on the surface to be tested a specified length of time. If the counterbalancing effect of the portion B has pulled sheet 2 away from the surface before this last mentioned specified length of time has expired, the surface is to be considered tack free or to have achieved the degree of tackiness for which the test is designed.

In a specific embodiment of the device for the determination of tack free surfaces, strip 1 making up base portion A and counterbalancing portion B is made of metal approximately 0.016 inches in thickness and sheet 2 is made of aluminum foil 0.00025 inches in thickness. Base portion A is a 1" square and counterbalancing area B is 1" x 2". Weight 4 is a one-pound lead weight. The aluminum foil used is selected as free as possible from imperfections and is wrapped around base B smoothly, without wrinkles, and with its brightest side turned out. The angle of the counterbalancing portion B to the base portion A should be adjusted so that a weight of 5 grams placed in the center of base portion A is just sufficient to overcome the unbalanced force.

When the device having the foregoing characteristics and measurements is used to determine whether or not a surface is tack free, the one pound lead weight is placed on the top of the base member A and the so assembled device then placed upon the surface to be tested. Weight 4 is allowed to remain on the base member A for exactly 5 seconds and is then removed. The surface is considered to be tack free if the foil 2 is pulled completely away from the surface by the counterbalancing portion B in less than 5 seconds.

As shown, the metallic foil 2 is renewable and should be replaced whenever it becomes wrinkled or soiled. If other materials or dimensions are used for the instrument, different calibration will be necessary.

The foregoing description has been concerned with the use of the device in determining whether or not a surface is tack free. As previously pointed out, it is within the scope and contemplation of the invention to employ the device in testing or determining various degrees of tackiness. For instance, it may be desirable to apply a coating such as varnish or the like and then permit this coating to reach a predetermined degree of tackiness, i. e., a condition in which the surface is not tack free. In such instances, the weight of the member 4 and the angle of the counterbalancing portion B with respect to base portion A may be varied so that after the weight 4 has been resting upon the base member A a specified length of time, the counterbalancing member B will pull the foil away from the coating if the latter has reached the desired degree of tackiness.

What is claimed is:

1. A device for determining whether or not a coating is tack-free comprising a base member having an upper surface for carrying a weight and a flat under surface adapted to lie flat on said coating for a predetermined period of time, renewable, flexible sheet material stretched across said under surface, and a counterbalancing member rigidly attached to said base member and disposed at an angle thereto, the angle between the base member and the counterbalancing member bearing a predetermined relation to the particular weight employed, said counterbalancing member, after removal of the weight, being adapted to strip the base member from the coating within a predetermined period of time if the coating is tack-free.

2. A device for determining whether or not a coating is tack-free comprising a sheet metal base member having an upper surface for carrying a weight and a flat under surface adapted to lie flat on said coating for a predetermined period of time, renewable metal foil stretched across said under surface edges of said base member and anchored to said flat upper surface, and a sheet metal counterbalancing member integral with said base member and disposed at an angle thereto, the angle between the base member and the counterbalancing member bearing a predetermined relation to the particular weight employed, said counterbalancing member, after removal of the weight, being adapted to strip the base member from the coating within a predetermined period of time if the coating is tack-free.

ROWLAND E. BONNER.
MORRIS D. BREWSTER.